United States Patent Office 2,978,489
Patented Apr. 4, 1961

2,978,489

NITRO-DICARBAMATES

Milton B. Frankel, Pasadena, Calif., assignor to Aerojet-General Corporation, Azusa, Calif., a corporation of Ohio No Drawing. Filed Jan. 3, 1955, Ser. No. 479,656

19 Claims. (Cl. 260—482)

This invention relates to new compositions of matter and a method for their preparation. In particular, it relates to nitrodicarbamates having the general formula:

$$R-\underset{H}{\underset{|}{N}}-\underset{O}{\overset{O}{\overset{\|}{C}}}-O-A-O-\overset{O}{\overset{\|}{C}}-\underset{H}{\underset{|}{N}}-R'$$

wherein R and R' are the same or different and are nitroalkyl radicals, and A is a nitroalkylene radical.

The compounds of this invention are prepared by condensing nitro-isocyanates with nitro-diols, in accordance with the general reaction scheme set forth below:

$$R-NCO+HO-A-OH \longrightarrow R-\underset{H}{\underset{|}{N}}-\overset{O}{\overset{\|}{C}}-O-A-O-\overset{O}{\overset{\|}{C}}-\underset{H}{\underset{|}{N}}-R'$$

wherein R, R' and A are as defined above. Nitrocarbamates in which R and R' are different are conveniently prepared by employing a mixture of isocyanates in the reaction.

As a matter of convenience, the reaction is usually conducted at reflux temperature. Although the reaction can be performed at a lower temperature, the rate of reaction is usually too slow for practical purposes, while at higher temperatures, the reaction is difficult to control. The reaction is preferably, although not necessarily, conducted in the presence of a catalyst such as ferric acetylacetonate. Increased smoothness and control of the reaction are achieved when a reaction solvent such as chloroform is used.

The nitro-isocyanates used as starting materials in this invention are prepared by reacting nitro-acid halides with sodium azide and subsequently heating the resultant organic azides under anhydrous conditions to effect their rearrangement to the isocyanates, as disclosed in assignee's copending applications Serial No. 405,515, filed January 21, 1954, now Patent No. 2,923,726, and Serial No. 416,386, filed March 15, 1954, now abandoned. The nitro-acid halides are obtained in the conventional manner by reacting a thionyl halide with a nitro-acid, such as 3,3-dinitrobutanoic and 3,3-dinitropentanoic acid. A wide variety of such nitro-acids are obtainable by condensing unsaturated acids, such as acrylic acid, with nitronate salts of alkanes, as described in the J. Org. Chem., vol. 16, pp. 161–4, 1951.

The nitro-diols used as starting materials in this invention can be prepared by several methods. Nitro-diols such as 2-nitro-1,3-propanediol, 2,2-dinitro-1,3-propanediol and 2,2,4,4-tetranitro-1,5-pentanediol are generally prepared by condensing formaldehyde with nitronate salts of alkanes, as disclosed in assignee's copending application Serial No. 371,150, filed July 29, 1953, now abandoned, and United States Patent No. 2,522,959, issued September 19, 1950. Nitro-diols such as 3,3-dinitro-1,5-pentanediol are prepared by ester interchange of the corresponding acid esters, as disclosed in assignee's copending application Serial No. 439,457, filed June 25, 1954, now abandoned.

To more clearly illustrate my invention, the following examples are presented. It should be understood, however, that these examples are presented merely as a means of illustration, and are not intended to limit the scope of the invention in any way.

EXAMPLE I

*Preparation of N,N'-bis(3,3,3-trinitropropyl)-2,2-dinitropropylene dicarbamate*

Equivalent quantities of 3,3,3-trinitropropyl isocyanate and 2,2-dinitro-1,3-propanediol were refluxed in chloroform with about 1% by weight ferric acetylacetonate for 8 hours. The solution was then evaporated to dryness in vacuo, leaving a quantitative yield of a yellow oil, N,N'-bis(3,3,3-trinitropropyl)-2,2-dinitro-propylene dicarbamate.

EXAMPLE II

*Preparation of N,N'-bis(3,3-dinitrobutyl)-2,2-dinitropropylene dicarbamate*

Equivalent quantities of 3,3-dinitrobutyl isocyanate and 2,2-dinitro-1,3-propanediol were refluxed in chloroform with about 1% by weight ferric acetylacetonate for 8 hours. The solution was then evaporated to dryness in vacuo. The residue was recrystallized from chloroform in quantitative yield, M.P. 128–129° C. The elemental analysis of the product is as follows:

Calculated for $C_{13}H_{20}N_8O_{16}$: percent C, 28.68; percent H, 3.70; percent N, 20.59. Found: percent C, 29.13; percent H, 3.91; percent N, 20.82.

A wide variety of compounds can be prepared in accordance with the procedure set forth in the above examples. N,N'-bis(3,3,3-trinitropropyl)-2-nitropropylene dicarbamate is prepared by condensing 2-nitro-1,3-propanediol with 3,3,3-trinitropropyl isocyanate; N,N'-bis(3,3-dinitrohexyl)-2,2-dinitropropylene dicarbamate is prepared by condensing 2,2-dinitro-1,3-propanediol with 3,3-dinitrohexyl isocyanate; and N,N'-bis(2,2,4,4-tetranitropentyl)-2,2-dinitropropylene dicarbamate is prepared by condensing 2,2-dinitro-1,3-propanediol with 2,2,4,4-tetranitropentyl isocyanate.

It is apparent from the above discussion that any member of this series of nitro dicarbamates can be prepared by merely condensing the appropriate nitro isocyanate with a nitroalkylene diol, according to the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, nitro-dicarbamates having the general formula:

$$R-\underset{H}{\underset{|}{N}}-\overset{O}{\overset{\|}{C}}-O-A-O-\overset{O}{\overset{\|}{C}}-\underset{H}{\underset{|}{N}}-R'$$

wherein R and R' are lower nitroalkyl radicals and A is a lower nitroalkylene radical.

2. As a composition of matter, N,N'-bis(3,3,3-trinitropropyl)-2,2-dinitropropylene dicarbamate having the structural formula:

$$NO_2-\underset{\underset{NO_2}{|}}{\overset{\overset{NO_2}{|}}{C}}-CH_2CH_2-\underset{}{\overset{H}{N}}-\overset{O}{\overset{\|}{C}}-O-CH_2-\underset{\underset{NO_2}{|}}{\overset{}{C}}-CH_2-O-\overset{O}{\overset{\|}{C}}-\overset{H}{N}-CH_2CH_2-\underset{\underset{NO_2}{|}}{\overset{\overset{NO_2}{|}}{C}}-NO_2$$

3. As a composition of matter, N,N'-bis(3,3-dinitrobutyl)-2,2-dinitropropylene dicarbamate having the structural formula:

$$CH_3-\underset{\underset{NO_2}{|}}{\overset{\overset{NO_2}{|}}{C}}-CH_2CH_2-\overset{H}{N}-\overset{O}{\overset{\|}{C}}-O-CH_2-\underset{\underset{NO_2}{|}}{\overset{}{C}}-CH_2-O-\overset{O}{\overset{\|}{C}}-\overset{H}{N}-CH_2CH_2-\underset{\underset{NO_2}{|}}{\overset{\overset{NO_2}{|}}{C}}-CH_3$$

4. As a composition of matter, N,N'-bis(3,3,3-trinitropropyl)-2-nitropropylene dicarbamate having the structural formula:

$$NO_2-\underset{\underset{NO_2}{|}}{\overset{\overset{NO_2}{|}}{C}}-CH_2CH_2-\overset{H}{N}-\overset{O}{\overset{\|}{C}}-O-CH_2-\underset{\underset{NO_2}{|}}{\overset{}{CH}}-CH_2-O-\overset{O}{\overset{\|}{C}}-\overset{H}{N}-CH_2CH_2-\underset{\underset{NO_2}{|}}{\overset{\overset{NO_2}{|}}{C}}-NO_2$$

5. As a composition of matter, N,N'-bis(3,3-dinitrohexyl)-2,2-dinitropropylene dicarbamate having the structural formula:

$$CH_3CH_2CH_2-\underset{\underset{NO_2}{|}}{\overset{\overset{NO_2}{|}}{C}}-CH_2CH_2-\overset{H}{N}-\overset{O}{\overset{\|}{C}}-O-CH_2-\underset{\underset{NO_2}{|}}{\overset{\overset{NO_2}{|}}{C}}-CH_2-O-\overset{O}{\overset{\|}{C}}-\overset{H}{N}-CH_2CH_2-\underset{\underset{NO_2}{|}}{\overset{}{C}}-CH_2CH_2CH_3$$

6. As a composition of matter, N,N'-bis(2,2,4,4-tetranitropentyl)-2,2-dinitropropylene dicarbamate having the structural formula:

$$CH_3-\underset{\underset{NO_2}{|}}{\overset{\overset{NO_2}{|}}{C}}-CH_2-\underset{\underset{NO_2}{|}}{\overset{\overset{NO_2}{|}}{C}}-CH_2-\overset{H}{N}-\overset{O}{\overset{\|}{C}}-O-CH_2-\underset{\underset{NO_2}{|}}{\overset{\overset{NO_2}{|}}{C}}-CH_2-O-\overset{O}{\overset{\|}{C}}-\overset{H}{N}-CH_2-\underset{\underset{NO_2}{|}}{\overset{\overset{NO_2}{|}}{C}}-CH_2-\underset{\underset{NO_2}{|}}{\overset{\overset{NO_2}{|}}{C}}-CH_3$$

7. The method of preparing nitro-dicarbamates having the general formula:

$$R-\overset{H}{N}-\overset{O}{\overset{\|}{C}}-O-A-O-\overset{O}{\overset{\|}{C}}-\overset{H}{N}-R'$$

which comprises reacting a nitroalkyl isocyanate having the general formula:

$$R-NCO$$

with a nitroalkanediol having the general formula:

$$HO-A-OH$$

wherein R and R' are lower nitroalkyl radicals and A is a lower nitroalkylene radical.

8. The method of claim 7 wherein the reaction is conducted in the presence of ferric acetylacetonate.

9. The method of claim 8 wherein the reaction is conducted in the presence of an inert organic solvent.

10. The method of preparing N,N'-bis(3,3,3-trinitropropyl)-2,2-dinitropropylene dicarbamate which comprises reacting 3,3,3-trinitropropyl isocyanate with 2,2-dinitro-1,3-propanediol.

11. The method of claim 10 wherein the reaction is conducted in the presence of ferric acetylacetonate.

12. The method of preparing N,N'-bis(3,3-dinitrobutyl)-2,2-dinitropropylene dicarbamate which comprises reacting 3,3-dinitrobutyl isocyanate with 2,2-dinitro-1,3-propanediol.

13. The method of claim 12 wherein the reaction is conducted in the presence of ferric acetylacetonate.

14. The method of preparing N,N'-bis(3,3,3-trinitropropyl)-2-nitropropylene dicarbamate which comprises reacting 2-nitro-1,3-propanediol with 3,3,3-trinitropropyl isocyanate.

15. The method of claim 14 wherein the reaction is conducted in the presence of ferric acetylacetonate.

16. The method of preparing N,N'-bis(3,3-dinitrohexyl)-2,2-dinitropropylene dicarbamate which comprises reacting 2,2-dinitro-1,3-propanediol with 3,3-dinitrohexyl isocyanate.

17. The method of claim 16 wherein the reaction is conducted in the presence of ferric acetylacetonate.

18. The method of preparing N,N'-bis(2,2,4,4-tetranitropentyl)-2,2-dinitropropylene dicarbamate which comprises reacting 2,2-dinitro-1,3-propanediol with 2,2,4,4-tetranitropentyl isocyanate.

19. The method of claim 18 wherein the reaction is conducted in the presence of ferric acetylacetonate.

References Cited in the file of this patent

UNITED STATES PATENTS 2,703,810   Viand _____ Mar. 8, 1955